US008214853B2

(12) United States Patent
Dasher et al.

(10) Patent No.: US 8,214,853 B2
(45) Date of Patent: Jul. 3, 2012

(54) SYSTEMS AND METHODS FOR PROVIDING CONTENT TO A SUBSCRIBER THROUGH A FOREIGN SERVICE PROVIDER AND FOR FACILITATING THE SUBSCRIBER INCURRING A FEE FOR VIEWING THE CONTENT

(75) Inventors: Charles H. Dasher, Lawrenceville, GA (US); Alan S. Rouse, Lawrenceville, GA (US)

(73) Assignee: Ericsson Television, Inc, Duluth, GA (US)

( * ) Notice: Subject to any disclaimer, the term of this patent is extended or adjusted under 35 U.S.C. 154(b) by 540 days.

(21) Appl. No.: 12/552,526

(22) Filed: Sep. 2, 2009

(65) Prior Publication Data
US 2011/0055859 A1  Mar. 3, 2011

(51) Int. Cl.
*H04N 7/16* (2006.01)
(52) U.S. Cl. .................. 725/1; 725/62; 725/91
(58) Field of Classification Search .......... 725/1, 6, 725/62, 86–87, 91, 104
See application file for complete search history.

(56) References Cited

U.S. PATENT DOCUMENTS

| 7,089,316 B2* | 8/2006 | Andersen et al. ............. 709/229 |
| 2006/0259927 A1 | 11/2006 | Acharya et al. |
| 2008/0127255 A1* | 5/2008 | Ress et al. ................... 725/38 |
| 2009/0100477 A1* | 4/2009 | Jeffs ........................... 725/86 |
| 2010/0023980 A1* | 1/2010 | Yamagishi et al. ........... 725/104 |
| 2010/0122305 A1* | 5/2010 | Moloney .................... 725/93 |

FOREIGN PATENT DOCUMENTS

| EP | 1 780 983 A1 | 5/2007 |
| EP | 1 895 777 A1 | 3/2008 |

* cited by examiner

*Primary Examiner* — Ngoc Vu

(57) ABSTRACT

Various embodiments of the present invention relate to systems and methods for providing content to a subscriber of a first video service provider through a second video service provider and for facilitating the subscriber incurring a fee for viewing the content. In particular embodiments, the systems and methods authenticate a subscriber of a first video service provider and allow the subscriber to view content through a second video service provider and incur the fee for viewing such content. Various embodiments may make use of a content brokerage provider to facilitate the brokerage of content between video servicer providers. Further, in various embodiments, the first video service provider (and/or content brokerage provider) bills the subscriber for the fee incurred for viewing the content through the second video service provider and, in particular embodiments, a portion of the fee is paid to the second video service provider.

17 Claims, 8 Drawing Sheets

SYSTEMS AND METHODS FOR PROVIDING CONTENT TO A SUBSCRIBER THROUGH A FOREIGN SERVICE PROVIDER AND FOR FACILITATING THE SUBSCRIBER INCURRING A FEE FOR VIEWING THE CONTENT

BACKGROUND OF THE INVENTION

1. Field of the Invention

The disclosed invention generally relates to systems and methods for providing content to a subscriber of a first video service provider through a second video service provider and for facilitating the subscriber incurring a fee for viewing the content, and more specifically, to systems and methods to authenticate a subscriber of a first video service provider and to allow the subscriber to view content through a second video service provider and to incur the fee for viewing such content.

2. Description of the Related Art

Subscribers of a video service provider (such as a cable service provider) will often times subscribe to various services offered by the provider. For example, one such service is video on demand (VOD), which provides individual subscribers a variety of content from which an individual subscriber can select a particular content (such as a movie), and the service provider streams the content to the individual subscriber at a time convenient to the subscriber. This content may be provided at no additional cost by the service provider, provided as part of a subscription service (fixed fee) to the subscriber, or provided for a prescribed time (fee per use). To select VOD content, the subscriber searches through a catalog of available content, selects one of the content items, agrees to payment terms if applicable, and then watches the content.

Subscribers typically access VOD services at their home through a single service provider. Therefore, if a subscriber is not at home, he or she cannot make use of this service. For example, when visiting a relative, a subscriber cannot rent content through his or her home service provider's system. If the subscriber were to rent content through his or her relative's service provider, the subscriber's relative would then be billed by the relative's service provider for the rental. Therefore, a need exists that allows a subscriber of a first service provider to view content through a second service provider (who serves as a broker for the first service provider) and to incur the fee for viewing such content.

BRIEF DESCRIPTION OF THE DRAWINGS

Figure 1:
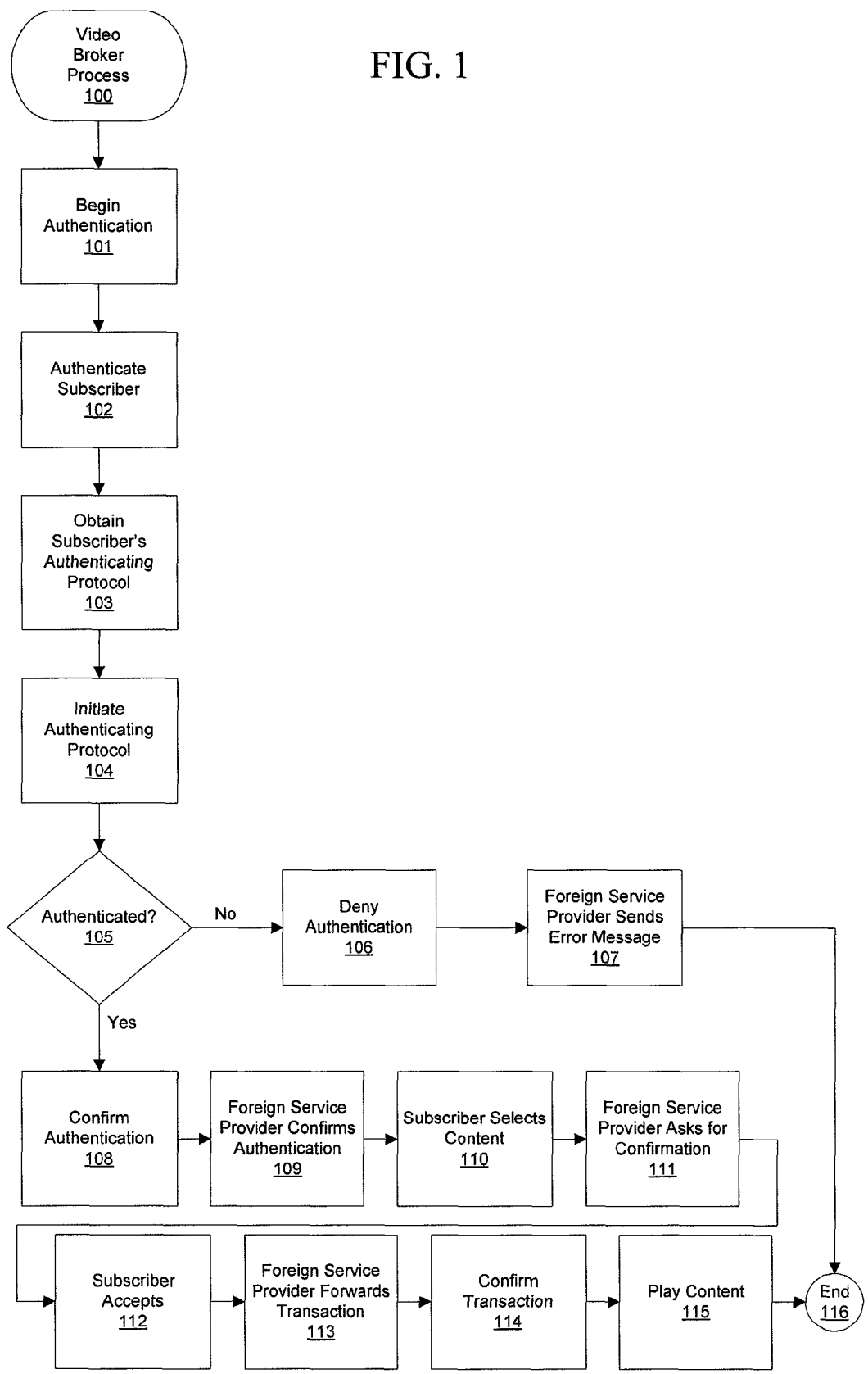

Having thus described various embodiments of the invention in general terms, reference will now be made to the accompanying drawings, which are not necessarily drawn to scale, and wherein:

FIG. 1 is a flow diagram illustrating the process for brokering content according to various embodiments of the invention.

Figure 2:
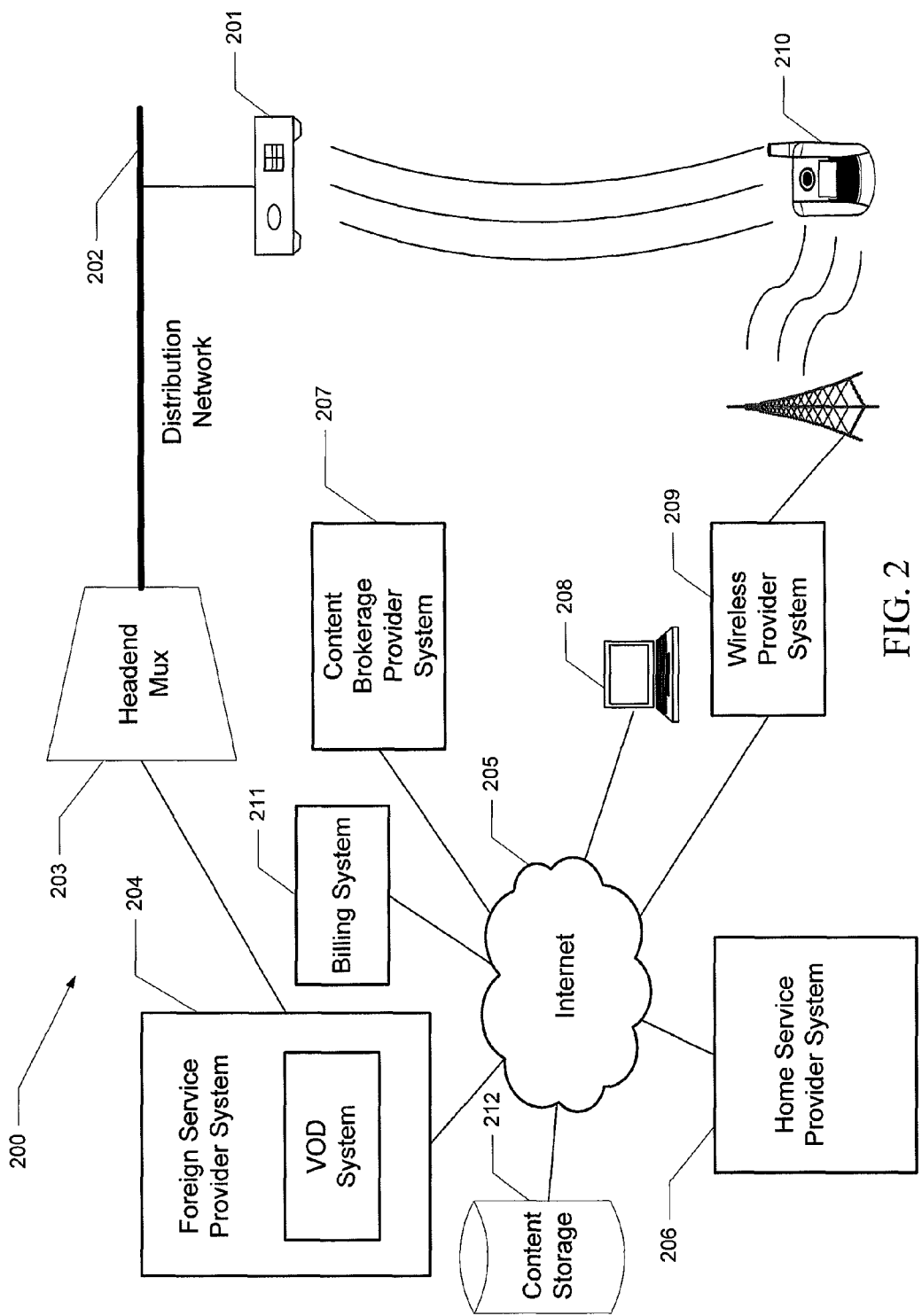

FIG. 2 is a schematic diagram illustrating a content brokerage system according to various embodiments of the invention.

Figure 3:
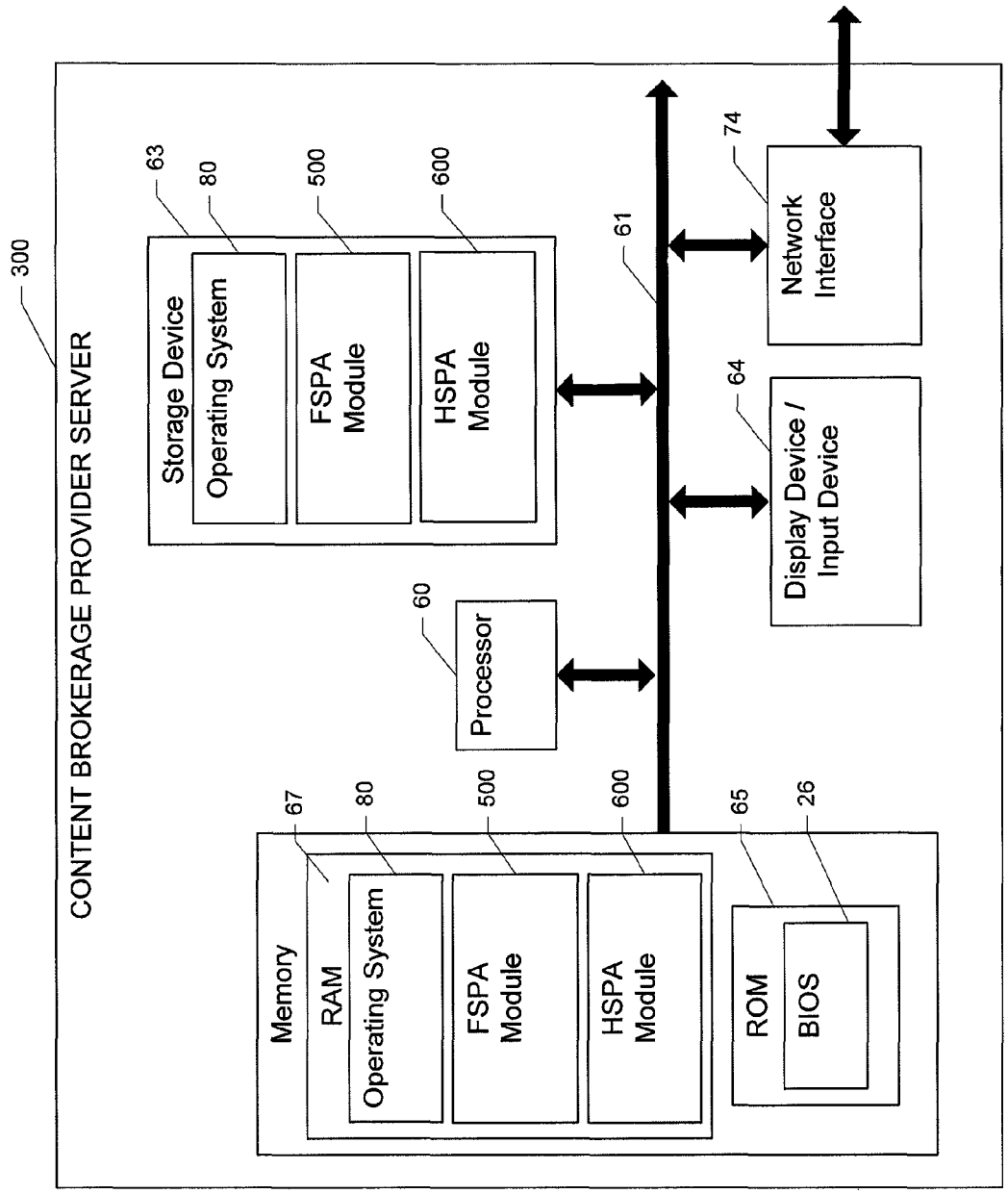

FIG. 3 is a schematic diagram illustrating a content brokerage provider server according to various embodiments of the invention.

Figure 4:
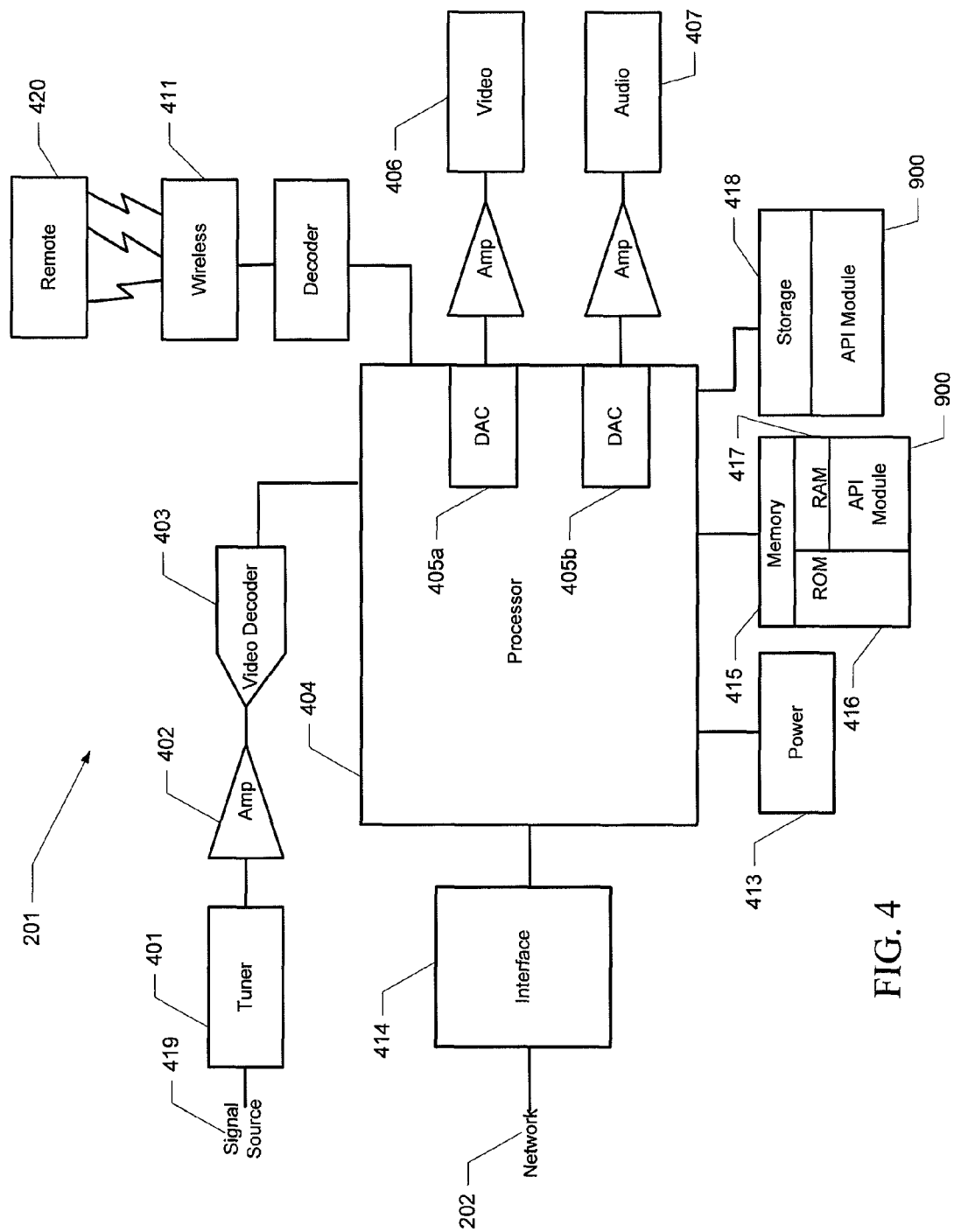

FIG. 4 is a schematic diagram illustrating a set-top box according to various embodiments of the invention.

Figure 5:
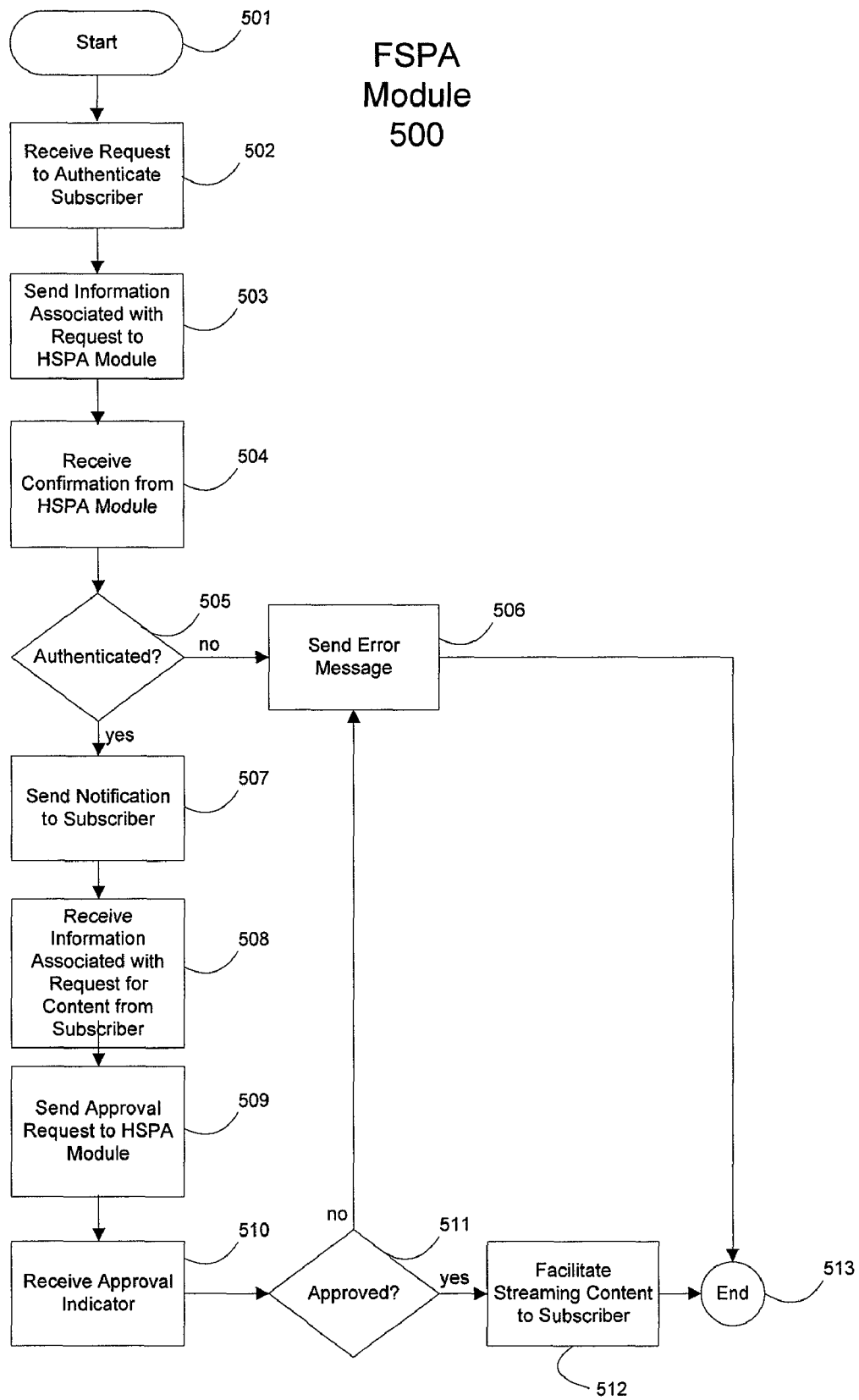

FIG. 5 is a flow diagram of a foreign service provider authentication module according to various embodiments of the invention.

Figure 6:
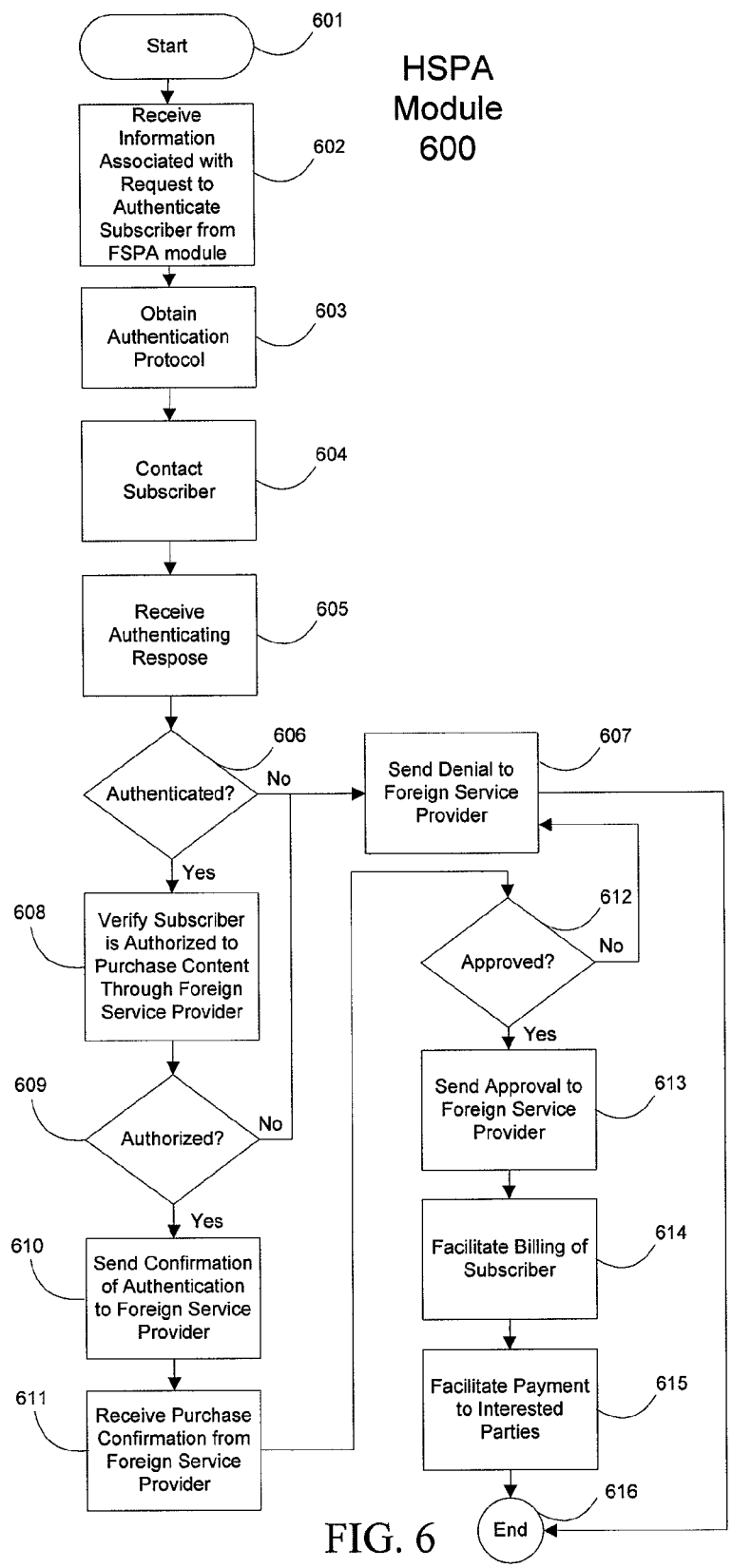

FIG. 6 is a flow diagram of a home service provider authentication module according to various embodiments of the invention.

Figure 7:
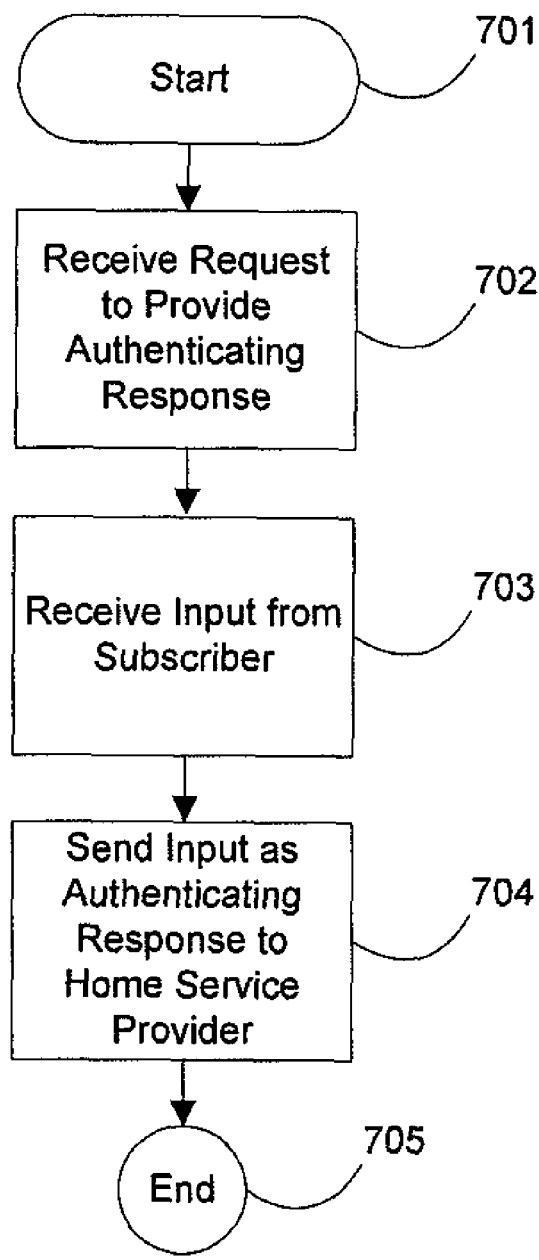

FIG. 7 is a flow diagram of a subscriber device module according to various embodiments of the invention.

Figure 8:
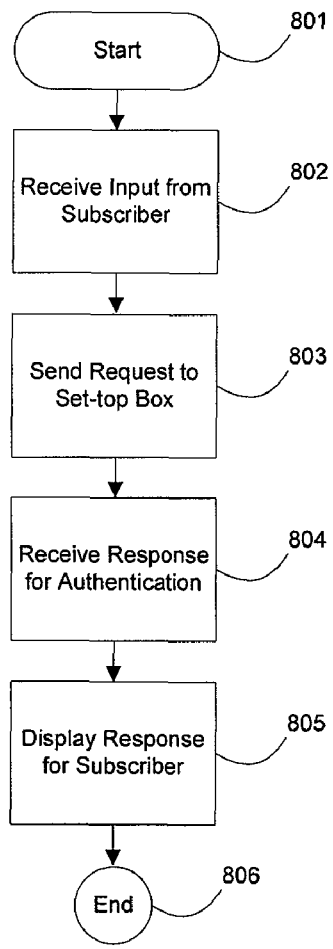

FIG. 8 is a flow diagram of an alternative subscriber device module according to various embodiments of the invention.

Figure 9:
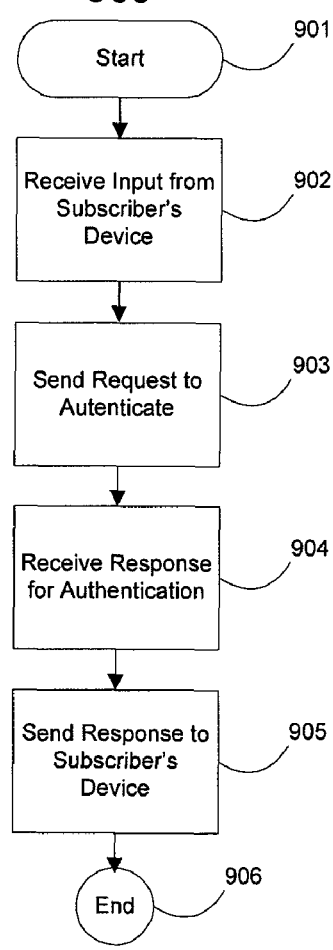

FIG. 9 is a flow diagram of a set-top box API module according to various embodiments of the invention.

DETAILED DESCRIPTION OF THE INVENTION

The present invention now will be described more fully with reference to the accompanying drawings, in which some, but not all embodiments of the invention are shown. Indeed, this invention may be embodied in many different forms and should not be construed as limited to the embodiments set forth herein. Like numbers refer to like elements throughout.

As should be appreciated, the embodiments may be implemented in various ways, including as methods, apparatus, systems, or computer program products. Accordingly, the embodiments may take the form of an entirely hardware embodiment or an embodiment in which a processor is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

The embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

Brief Overview of an Embodiment

Various embodiments of the present invention provide content to a subscriber of a first service provider (e.g., home service provider) through a second service provider (e.g., foreign service provider) and facilitate the subscriber incurring the fee for viewing the content. Further, in various embodiments, this entails the systems and methods authenticating a subscriber of the home service provider and allowing the subscriber to view content through the foreign service provider and to incur the fee for viewing such content. "Content" is a particular piece of media. For instance, content may be a television program and/or a movie. Furthermore, the term "provider" is used from this point forward to indicate a cable service provider, a satellite TV provider, or any other provider of distributed video content. The term "subscriber" is used to describe a person (or entity) that subscribes to one or more services offered by a service provider, such as a cable service provider or a satellite TV provider. The term "home service provider" is used to reference a service provider that provides a subscriber with video content while the subscriber is typically at home or at a location the subscriber receives his or her subscribed-to services. The term "foreign service provider" is used to reference a service provider that does not provide the subscriber with video content while the subscriber is typically at home or at the location the subscriber receives his or her subscribed-to services.

FIG. 1 illustrates one embodiment of a flow diagram of a process 100 for brokering video content. For instance, a subscriber of a particular service provider (e.g., home service provider) may be traveling and staying at a relative's home. During the stay, the subscriber may be staying in a room with a television and may wish to view a program on the television that requires a fee to view. (For example, the program may be offered through a VOD service.) Further, the relative may be receiving cable service from a different service provider (e.g., foreign service provider). Thus, in order for the subscriber to view the program, the relative would normally incur the cost because the purchase of the VOD program would be charged to the relative's account with the foreign service provider. However, various embodiments of the invention address this issue and provide systems and methods by which the subscriber can view the program at his or her relative's home and have the purchase for viewing the program charged to his or her account with the home service provider.

First, in various embodiments, a content brokerage provider enters into business relationships with the home service provider and the foreign service provider. In these particular embodiments, the content brokerage provider facilitates the brokering of content between the home service provider and the foreign service provider by providing the necessary system components (e.g., hardware and software) and communication channels. For instance, in the example, the content brokerage provider may provide the foreign service provider an application to install within its VOD service so that the subscriber can request to view the VOD program and have the fee for viewing the program charged to his or her account with the home service provider. Further detail for the necessary components and communication channels are provided below in FIG. 2 according to a particular embodiment of the invention.

In addition, in various embodiments, the content brokerage provider may enter into business relationships with other parties to facilitate the brokering of content. For instance, in one embodiment, the content brokerage provider may enter into a business relationship with one or more wireless providers to facilitate communication directly with subscribers. Further, the content brokerage provider may enter into business relationships with subscribers of various content providers. In one embodiment, these subscribers enroll for service directly with the content brokerage provider and provide the necessary information to facilitate the service. In another embodiment, the subscribers enroll for the service through their individual content providers.

Furthermore, it should be apparent to those of ordinary skill in the art that in various embodiments the service providers can facilitate the brokering of content among themselves without having to use the content brokerage provider. Thus, in these particular embodiments, the content service providers set up business relationships with each other and with other parties (such as wireless providers) and set up the necessary system components themselves.

Returning to FIG. 1, in the example, the subscriber visiting his or her relative invokes the VOD service through the set-top box connected to the relative's television. The set-top box is provided by the foreign content provider and deliver's the relative's cable service. Further, an option has been provided in the VOD service for a subscriber of a different service provider to select so that the subscriber can view VOD content and be billed through his or her home service provider (e.g., video broker function). In this case, the subscriber selects the option and a list of various service providers is shown for the subscriber to select from, according to one embodiment. The subscriber scans through the list and selects his or her home service provider from the list. Thus, the process 100 begins with authentication of the subscriber, shown as Step 101.

In various embodiments, the subscriber is prompted for identification information, such as a username and/or an account number and/or a password. The subscriber enters the information by utilizing various input devices such as a remote control or a keyboard in communication with the set-top box. In response, the set-top box directs the identification information over the foreign service provider's distribution network to the headend associated with the network. The headend directs the identification information through the foreign service provider's system along with a request for authentication to the content brokerage provider's system. For instance, in one embodiment, the foreign service provider's system is in communication with the content brokerage provider's system over the Internet and the request is routed over the Internet to the content brokerage provider's system.

The content brokerage provider's system receives the request along with the identification information and authenticates the subscriber, shown as Step 102. This step may be carried out in different ways according to various embodiments. For instance, in one embodiment, the content brokerage provider's system stores information about the subscriber that is used to authenticate the subscriber. In one example, the subscriber registers directly with the content brokerage provider and during the registering process provides the information necessary to authenticate the subscriber. Thus, in this example, the content brokerage provider's system retrieves the stored information for the subscriber and compares the information with the identification information received along with the request from the foreign service provider's system.

In another embodiment, the content brokerage provider's system communicates with the subscriber's home service provider's system to authenticate the subscriber. This may be more desirable in some instances because the home service provider can determine whether the subscriber is a customer in good standing with the home service provider.

Further, in Step 103, the content brokerage provider's system (or home service provider's system) obtains the subscriber's authenticating protocol from the stored information. In various embodiments, the stored information indicates a mechanism for contacting the subscriber to request the subscriber to authenticate that he or she has actually selected the video broker function. For example, in one embodiment, the stored information indicates that the subscriber should be contacted via short message service (SMS). Thus, in Step 104, the content brokerage provider's system initiates the authenticating protocol by communicating with the subscriber's wireless provider's system to send the subscriber a message to his or her wireless device that requests a response from the subscriber. In other embodiments, the stored information indicates to send the subscriber an email or to contact the subscriber via a phone call. Thus, in these particular embodiments, the content brokerage provider's system sends the subscriber an email or phone call to initiate the authenticating protocol.

The message sent to the subscriber's wireless device may request different information according to various embodiments. For instance, the message may simply ask the subscriber to confirm that he or she has selected the video broker function. However, in other embodiments, the message may involve requesting more detailed information to authenticate that the subscriber has actually selected the video broker function. For example, in one embodiment, the message may request the subscriber to respond with a username and password to confirm the identity of the subscriber. In another example, the subscriber may have included along with the identification information sent from the set-top box an answer to a question or a phrase. For instance, the subscriber may have typed in the phrase, "staying at grandma's house." In this example, the message may request the subscriber to re-enter this phrase in order to authenticate that the subscriber has actually selected the video broker function.

Thus, in various embodiments, the subscriber responds to the message and information associated with the subscriber's response is routed through the subscriber's wireless provider's system back to the content brokerage provider's system (or, in alternative embodiments, directly to the subscriber's home content provider's system). In Step 105, the content brokerage provider's system determines whether the subscriber's identity is authenticated. In one embodiment, this entails the content brokerage provider's system verifying the information associated with the subscriber's response and confirming the information based on the information stored for the subscriber and/or the identification information received along with the request from the foreign service provider's system.

In alternative embodiments, the home service provider's system receives information received in the response from the subscriber and verifies the subscriber's identity. Thus, in these particular embodiments, the home service provider's system sends a confirmation to the content brokerage provider's system that the subscriber has been authenticated (or, in other embodiments, the home service provider's system sends the confirmation directly to the foreign service provider's system).

If the content brokerage provider's system determines that the subscriber has not been authenticated, in various embodiments, the system sends a response to the foreign service provider's system indicating that authentication has been denied for the subscriber, shown as Step 106. In response, the foreign service provider's system sends an error message to the subscriber indicating to the subscriber that he or she has not been authenticated and therefore cannot use the broker system function, shown as Step 107. For instance, in one embodiment, the foreign service provider's system sends the error message through the headend and over the provider's distribution network to the set-top box. In turn, the set-top box displays the message on the television to the subscriber.

If the content brokerage provider's system determines that the subscriber has been authenticated, in various embodiments, the content brokerage provider system sends a confirmation to the foreign service provider's system, shown as Step 108. In Step 109, the foreign service provider's system confirms to the subscriber that he or she has been authenticated by sending a message to the set-top box. That is, in the example, the foreign service provider's system sends a message that informs the subscriber that he or she is approved to make a purchase.

The subscriber is then able to browse the content available on the foreign service provider's VOD service and select a desired content to view, shown as Step 110. For example, the subscriber selects a pay-per-view movie to view. The request to view the pay-per-view movie is forwarded to the foreign service provider's system and the system responses by requesting the subscriber to confirm the purchase, shown as Step 111. In Step 112, the subscriber accepts the confirmation and commits the transaction to purchase the viewing of the movie.

In response, the foreign service provider's system sends information on the transaction to the content brokerage provider's system, shown as Step 113. In one embodiment, the content brokerage provider's system records the transaction and confirms the transaction with the foreign service provider's system. In another embodiment, the content brokerage provider's system sends information on the transaction to the home service provider's system and the home service provider's system records the transaction and confirms the transaction. Yet, in another embodiment, the foreign service provider's system sends information on the transaction directly to the home service provider's system.

In Step 114, the confirmation of the transaction is received by the foreign service provider's system. As a result, in Step 115, the foreign service provider's system streams the requested content (e.g., the pay-per-view movie) to the set-top box located in the relative's home and the subscriber is able to view the movie.

In various embodiments, the subscriber receives a bill from his or her home service provider for viewing the movie. For instance, the subscriber receives the bill for viewing the movie on his or her monthly statement from the home service provider. Further, in these particular embodiments, the home service provider may pay a portion of the fee received from the subscriber to the content brokerage provider and/or the foreign service provider. In other embodiments, the subscriber receives the bill directly from the content brokerage provider. In these particular embodiments, the content brokerage provider may pay a portion of the fee to the home service provider and/or the foreign service provider.

As a result of the process 100, the subscriber is able to order and view content while not at home and at an individual's home (e.g., another individual's home), and is able to view the content without the individual incurring the fee for viewing the content. It should be apparent to one of ordinary skill in the art that the above-described process 100 is provided as an example only and that the process 100 can be used in various other situations. For example, the subscriber could be located in an airport and the foreign service provider could be a kiosk service that provides monitors in the airport for individuals.

The subscriber could also be using a portable device (such as a laptop computer or an iPhone®) and may access a foreign service provider through the Internet or an application loaded on the portable device. Further, in certain circumstances, the foreign service provider may be the same service provider as the subscriber's home service provider. For instance, the subscriber may be visiting a relative who has the same cable provider. In these cases, the subscriber may desire to watch pay-per-view content but ensure the fee for viewing the content is charged to his or her account with the cable provider. Thus, the description of the process 100 provided above is for illustrative purposes only and should not be construed to limit the scope of the invention.

System Architecture

A video content brokerage system 200 according to various embodiments of the invention is shown in FIG. 2. For instance, the system 200 may be configured to allow different cable providers providing cable programming to various subscribers to brokerage video content. However, the system 200 may also be configured to allow different satellite TV providers, other different providers of video content, or any combination thereof to brokerage content. Therefore, the system 200 depicted in FIG. 2 is provided for illustrative purposes only and should not be construed to limit the scope of the claimed invention.

As may be understood from this figure, in various embodiments, the system 200 includes more than one service providers' systems. The particular embodiment shown in FIG. 2 includes a foreign service provider system 204 and a home service provider system 206. As is described in further detail below, the foreign service provider system 204 is the provider system through which a subscriber of the home service provider system 206 request to view video content. In various embodiments, this request is received through the foreign service provider's distribution network 202.

In various embodiments, the distribution network 202 includes one or more set-top boxes 201. In general, the set-top box 201 is a device that is used by a subscriber to receive digital cable signals for television and is configured to send data to the headend 203 of the foreign service provider system 204. For example, the set-top box 201 may be a device, such as a personal video recorder (PVR) provided by a cable company. The PVR receives the digital cable signal and feeds the signal into an individual's television set so that the individual can view the cable company's cable television programming.

As shown, in various embodiments, the set-top box 201 communicates with the headend 203 of the foreign service provider system 204 over the distribution network 202. The headend 203 routes messages (e.g. subscriber requests) received from the set-top box 201 to various components of the foreign service provider system 204 and streams content (e.g., programs and movies) to the set-top box 201. For instance, in one embodiment, the headend 203 receives input from the user via the set-top box 201, interprets the input, and routes the input to the appropriate component of the foreign service provider system 204, such as the VOD system.

Further, in various embodiments, the system 200 includes a content brokerage provider system 207. As is described in further detail below, in particular embodiments, the content brokerage provider system 207 serves an intermediary that coordinates and facilitates the brokering of content and/or payment among service providers (e.g., the foreign service provider system 204 and the home service provider system 206).

In addition, in various embodiments, the foreign service provider system 204, the home service provider system 206, and the content brokerage provider system 207 are connected over a communication channel. For instance, in FIG. 2, the foreign service provider system 204, the home service provider system 206, and the content brokerage provider system 207 are connected over the Internet 205. Further, in various embodiments, the two service provider systems 204, 206 and content brokerage provider system 207 may make use of security measures such as a virtual private network (VPN) or encryption to communicate. However, it should be obvious to those of ordinary skill in the art, in light of this disclosure, that the two service provider systems 204, 206 and content brokerage provider system 207 may use other channels of communication in other embodiments, such as a local area network (LAN), a wide area network (WAN), or a wireless network.

As depicted in FIG. 2, the system 200 may also include other provider systems such as a wireless provider system 209. As is described in greater detail below, the wireless provider system 209 may be utilized in various embodiments during the authentication process to authenticate the identity of a subscriber of the home service provider requesting to view content through the foreign service provider system 204. For instance, in one embodiment, the subscriber transmits an authenticating response via the subscriber's wireless device 210 (such as a cell phone) and the wireless provider system 209 forwards the response to the content brokerage provider system 207 or the home service provider system 206. In other embodiments, the subscriber's wireless device 210 may communicate directly with the set-top box 201 to initiate the authentication process, such as, for example, through infrared or blue tooth technology.

However, in other embodiments, subscribers may send authenticating responses via other mechanisms. For example, in one embodiment, a subscriber may send the content brokerage provider system 207 or the home service provider system 206 an authenticating response from a personal computer 208 or laptop computer over the Internet 209. For instance, the content brokerage provider system 207 or the home service provider system 206 may host a website and the subscriber logs onto the website to register a response or the content brokerage provider system 207 or the home service provider system 206 sends the subscriber an email, to which the subscriber replies to send a response. Those of ordinary skill in the art can envision numerous ways a subscriber can facilitate the authenticating response in light of this disclosure.

In various embodiments, the system 200 may also include storage medium, such as content storage 212. The content storage 212 is also in communication with other components of the system 200. In various embodiments, the content storage 207 may store a shared pool of content that is shared by a plurality of service providers (e.g., the home service provider and the foreign service provider). The pool of content may be a subset of each provider's content or it may be a superset. Further, the pool of content may include content for which specific permissions/licenses have been obtained so that the plurality of service providers can offer the content through their respective systems. In particular embodiments, the content storage 212 is accessed by a participating service provider's system (e.g., foreign service provider system 204 and/or home service provider system 206). This way, in particular embodiments, a roaming subscriber is able to watch content that is offered by his or her home service provider while visiting a friend on the foreign service provider's system 204.

Further, in various embodiments, the system 200 may also include a billing system 211. As is described in further detail below, in particular embodiments, the billing system 211 is adapted to record information associated with brokerage transactions and to facilitate billing the necessary parties involved in the transactions (such as subscribers, for example). In addition, in various embodiments, the billing system 211 may also be adapted to receive and to pay out fees associated with brokerage transactions. It should be further understood that the billing system 211 may be a stand-along system in some embodiments or may be included in other various systems, such as the foreign service provider system 204, home service provider system 206, or content brokerage provider system 207, in other embodiments.

Exemplary Content Brokerage Provider System

The content brokerage provider system 207 depicted in FIG. 2 may be comprised of several components according to various embodiments. For instance, in one embodiment, the system 207 may comprise one or more servers and one or more storage medium. In particular, FIG. 3 shows a schematic diagram of a server 300 that may reside in the content brokerage provider system 207 according to one embodiment of the invention. However, it should be understood that the content brokerage provider system 207 does not necessarily need to include only a single server. For instance, in various embodiments, the system 207 may include one or more servers executing one or more software applications. Thus, the server 300 shown in FIG. 3 is provided for illustrative purposes only and should not be construed to limit the scope of the invention.

In FIG. 3, the server 300 includes a processor 60 that communicates with other elements within the server 300 via a system interface or bus 61. Also connected to the server 300 is a display device/input device 64 for receiving and displaying data that may be used by administrative personnel. This display device/input device 64 may be, for example, a keyboard or pointing device that is used in combination with a monitor. The server 300 further includes memory 66, which preferably includes both read only memory (ROM) 65 and random access memory (RAM) 67. The server's ROM 65 is used to store a basic input/output system 26 (BIOS), containing the basic routines that help to transfer information between elements within the server 300. Alternatively, the server 300 can operate on one computer or on multiple computers that are networked together.

In addition, the server 300 includes at least one storage device 63, such as a hard disk drive, a floppy disk drive, a CD Rom drive, flash drive, or optical disk drive, for storing information on various computer-readable media, such as a hard disk, a removable magnetic disk, or a CD-ROM disk. As will be appreciated by one of ordinary skill in the art, each of these storage devices 63 is connected to the server bus 61 by an appropriate interface. The storage devices 63 and their associated computer-readable media provide nonvolatile storage for the server 300. It is important to note that the computer-readable media described above could be replaced by any other type of computer-readable media known in the art. Such media include, for example, magnetic cassettes, flash memory cards, digital video disks, and Bernoulli cartridges.

A number of program modules (e.g., set of computer program instructions) may be stored by the various storage devices and within RAM 67. For example, as shown in FIG. 3, program modules of the server 300 may include an operating system 80, a foreign service provider authentication (FSPA) module 500, and a home service provider authentication (HSPA) module 600. These modules 500, 600 may be used to control certain aspects of the operation of the server 300, as is described in more detail below, with the assistance of the processor 60 and an operating system 80.

Also located within the server 300 is a network interface 74, for interfacing and communicating with other elements of one or more networks (such as the network 205 described in the content brokerage system 200 depicted in FIG. 2.) It will be appreciated by one of ordinary skill in the art that one or more of the server's 300 components may be located geographically remotely from other server 300 components. Furthermore, one or more of the components may be combined, and additional components performing functions described herein may be included in the server 300.

Exemplary Set-Top Box

FIG. 4 shows a schematic diagram of a set-top box 201 according to one embodiment of the invention. The particular set-top box 201 depicted in FIG. 4 is configured to receive a digital signal from a cable provider or a satellite TV provider and to convert the signal into audiovisual content that is typically displayed on a television.

The particular embodiment of the set-top box 201 shown in FIG. 4 includes a processor 404 and storage 418, such as a hard disk drive and/or a flash drive, on which audiovisual data may be recorded and stored by the processor 404. In addition, the set-top box 201 further includes memory 415 composed of both read only memory (ROM) 416 and random access memory (RAM) 417.

The set-top box 201 further includes a tuner 401 configured to receive the incoming source signal 419. The tuner 401 sends the source signal 419 through an amplifier 402 and a video decoder 403 configured to translate the encoded source signal 419 into its original format. The video decoder 403 directs the translated source signal 419 to the processor 404.

In various embodiments, the processor 404 may also include a digital-to-analog converter (DAC) 405a, 405b configured to convert the translated source signal 419 from a digital signal to an analog signal if the television will only read an analog signal. Furthermore, the processor 404 is configured to feed the translated signal to the video and audio outputs 406, 407 of the set-top box 201 that are connected to the television.

In addition, the set-top box 201 may also include a wireless interface 411 that is configured to receive commands (and/or input) from a viewer via transmission from a remote control 420. The remote control 420 may transmit such commands using any number of transmitters, such as a radio frequency transmitter, a supersonic transmitter, or an optical transmitter. Further, the remote control 420 may be configured with cellphone-spelling style features so that a subscriber may enter text.

A number of program modules (such as a VOD module and/or an API module 900) may also be stored within the storage 418 and/or within the RAM 217 of the set-top box 201. These modules may be used to control certain aspects of the operation of the set-top box 201, as is described in more detail below, with the assistance of the processor 404.

Also located within the set-top box 201 is an interface 414, for interfacing and communicating with other elements of a network (such as the headend 203 in communication with the distribution network 202 described in the system 200 depicted in FIG. 2.) It will be appreciated by one of ordinary skill in the art that one or more of the components described to reside in the set-top box 201 may be located geographically remotely from the set-top box 201. Furthermore, one or more of the components may be combined, and additional components performing functions described herein may also be included in the set-top box 201.

Exemplary System Operation

As mentioned above, the system 200 according to various embodiments provides content to a subscriber of a first service provider (e.g., home service provider) through a second service provider (e.g., foreign service provider) and facilitates the subscriber incurring a fee for viewing the content. In various embodiments, the system 200 includes a content brokerage provider system 207. In particular embodiments, this system 207 serves as an intermediary between the home service provider system 206 and the foreign service provider system 204 and facilitates the brokering of content between the two service providers. Further, in particular embodiments, the content brokerage provider system 207 includes a foreign service provider authentication (FSPA) module 500 and a home service provider authentication (HSPA) module 600. These modules 500, 600 are configured to control certain aspects of the brokering process as described below.

It should be understood by those of ordinary skill in the art that various embodiments do not utilize the content brokerage provider system 207. For instance, in particular embodiments, the foreign service provider and the home service provider may broker content between themselves without the use of the content brokerage provider (or other third party). In these particular embodiments, the FSPA module 500 and the HSPA module 600 may be located within the foreign service provider system 204 and the home service provider system 206, respectively.

Further, various embodiments make use of portable devices to facilitate the authentication of a subscriber. In particular embodiments, the portable devices may include a module 700 that is configured to present the subscriber with authenticating information and receive authenticating input from the subscriber. These modules 500, 600, 700 are described in more detail below.

Business Relationships

As previously mentioned, in various embodiments, the content brokerage provider enters into business relationships with various service providers (e.g., the home service provider and the foreign service provider) to facilitate the brokering of content between the service providers. The business relationships may establish such elements as pricing for brokering the content, how, how much, and when are the parties paid after a brokering transaction, and protocols for various aspects of the brokering process, such as communication channels and/or payment methods. Further, the content brokerage service provider may provide each service provider with various components that may be needed to facilitate the brokerage system. For instance, in one embodiment, the content brokerage provider provides each foreign service provider an application to install within its VOD service so that the subscriber can request to view a VOD program and have the fee for viewing the program charged to his or her account with his or her home service provider. Further, in various embodiments, the content brokerage provider provides each service provider with the necessary software (and/or hardware) to facilitate communication with the content brokerage provider. As is described in more detail below, in various embodiments, the content brokerage provider system 207 and the service provider systems 204, 206 exchange information among the systems 204, 206, 207 during the brokering process.

In addition, in various embodiments, the content brokerage provider may enter into business agreements with other entities to facilitate the brokering of content. For instance, in one embodiment, the content brokerage provider may enter into business relationships with wireless providers to facilitate communication directly with subscribers. In these particular embodiments, the content brokerage provider may provide these entities with components (such as software and/or hardware) to aid in the brokering process. For example, as is described in greater detail below, the content brokerage provider may provide wireless providers with an application that the wireless providers provide to their subscribers to install on their wireless devices that is used during authentication of subscribers in the brokering process.

Further, in various embodiments, the content brokerage provider may enter into business relationships with subscribers of various content providers. In one embodiment, these subscribers enroll for service directly with the content brokerage provider and provide the necessary information to facilitate the service. For instance, the subscribers provide information necessary for authenticating the subscribers during brokering transactions. In another embodiment, the subscribers enroll for the service through their individual content providers.

Furthermore, it should be apparent to those of ordinary skill in the art in light of this disclosure that in various embodiments the service providers can facilitate the brokering of content among themselves without having to use the content brokerage provider. Thus, in these particular embodiments, the content service providers set up business relationships with each other and with other parties (such as wireless providers) and provide the necessary system components themselves.

Foreign Service Provider Authentication Module

As previously discussed, in various embodiments, the content brokerage provider system 207 may include a foreign service provider authentication (FSPA) module 500 that is adapted to facilitate certain aspects of brokering content between the foreign service provider and the home service provider. However, in other embodiments, the foreign service provider system 204 may include the FSPA module 500.

In particular embodiments, a subscriber may be located in a different location other than where he or she normally receives content from his or her subscribed-to content provider. For example, the subscriber may reside in Atlanta, Ga. and may be visiting a friend in Chicago, Ill. While in Chicago, the subscriber may wish to view a movie provided by his or her friend's service provider via the provider's pay-per-view VOD service. The friend's service provider may be the same service provider the subscriber subscribes to at home or may be a different provider. However, for purposes of this illustration, the friend's service provider is a different service provider (e.g., foreign service provider) than the subscriber's service provider at home (e.g., home service provider). In this case, the subscriber does not wish for his or her friend to incur the cost of viewing the movie. Therefore, the subscriber would like to view the movie and have the charge for the movie placed on his or her account with the home service provider.

In various embodiments, the subscriber accesses the VOD service of the foreign service provider on a set-top box 201 located at the friend's home. For instance, the subscriber turns on a television located at the friend's home and signals the set-top box 201 attached to the television to invoke the VOD service by selecting one or more buttons on a remote control in communication with the set-top box 201. The subscriber scans through various menus provided by the VOD service and selects a video broker function. In other embodiments, the video broker function may be provided by a stand-alone service on the set-top box 201.

Still, in other embodiments, the subscriber may not initiate the video broker function through the set-top box 201. For example, in other embodiments, the subscriber may initiate the process by placing a call with the content brokerage provider or by accessing a website provided by the content brokerage provider over a personal computer 208.

Accordingly, FIG. 5 illustrates a flow diagram of the FSPA module 500 according to various embodiments. This flow diagram may correspond to the steps carried out by the processor 60 in the content brokerage provider server 300 shown in FIG. 3 as it executes the module 500 in the server's RAM memory 67 according to various embodiments.

In various embodiments, the subscriber selects the video broker function and is prompted for identification information. For instance, in one embodiment, the subscriber is prompted for information such as the subscriber's home service provider and account number or other unique identifiers (such as username and password). In a particular embodiment, the subscriber may be provided with a list of service providers to choose from as the subscriber's home service provider. Thus, in this particular embodiment, the foreign service provider can control which providers the foreign service provider conducts brokerage transactions with.

In response to the subscriber entering the information, the FSPA module 500 receives a request to authenticate the subscriber, shown as Step 502. For example, in the embodiments that include a content brokerage system 207, the request along with the entered identification information forwarded by the set-top box 201 are sent from the foreign service provider system 204 over a communication channel 205 (such as the Internet) to the FSPA module 500 residing on the content brokerage provider system 207. In various embodiments, instead of the subscriber selecting his or her home service provider from a list, the FSPA module 500 looks up the subscriber's home service provider in information stored for the subscriber based on identification information provided by the subscriber.

In Step 503, the module 500 sends information associated with the request to the home service provider authentication (HSPA) module 600. As previously described, the HSPA module 600 may also reside in the content brokerage provider system 207 or may reside on a different system, such as the subscriber's home service provider system 206. As is described in greater detail below, the HSPA module 600, in various embodiments, authenticates the identity of the subscriber as indicated in the information received from the FSPA module 500. As a result, the HSPA module 600 sends the FSPA module 500 a response that provides a confirmation of the subscriber's identity. Thus, in Step 504, the FSPA module 500 receives a confirmation on whether the subscriber's identity has been authenticated and whether the subscriber is approved to make purchases through the foreign service provider.

In Step 505, if the FSPA module 500 determines from the confirmation that the subscriber has not been authenticated, the FSPA module 500 facilitates sending an error message to the subscriber, shown as Step 506. For instance, in one embodiment, the FSPA module 500 send a message to the foreign service provider system 204 that the subscriber has not been authenticated. In response, the foreign service provider system 204 sends an error message over the provider's distribution network to the set-top box 201. The set-top box 201 displays the error message on the television the subscriber is watching informing the subscriber that he or she has not been authenticated and therefore has not been approved to make purchases to view content.

If the FSPA module 500 determines from the confirmation that the subscriber has been authenticated, the FSPA module 500 facilitates sending a notification to the subscriber that he or she has been authenticated and has been approved to make purchases to view content, shown as Step 507. For instance, similar to facilitating sending an error message, the FSPA module 500 sends a message to the foreign service provider system 204 that the subscriber has been authenticated. In response, the foreign service provider system 204 sends a notification message over the provider's distribution network 202 to the set-top box 201 and the set-top box 201 displays the notification message on the television to the subscriber that the subscriber has been authenticated and therefore has been approved to make purchases to view content.

In various embodiments, the subscriber then browses the content available through the foreign service provider's VOD service and selects a desired content to watch. For example, the subscriber reviews the movie titles found on a list of recent releases and selects one of the titles on the list. The set-top box 201 sends information on the selection over the foreign service provider's distribution network 202 and to the foreign service provider system 204. The foreign service provider system 204 then forwards the information on the selection to the FSPA module 500 residing on the content brokerage provider system 207.

Thus, in Step 508, the FSPA module 500 receives the information on the selection from the subscriber. That is, in the example, the FSPA module 500 receives information on the subscriber's selection of the title from the list of the recent releases. In various embodiments, the FSPA module 500 may or may not store the information on the subscriber's selection in memory on the content brokerage provider system 207 (and/or, in alternative embodiments, the foreign service provider system 204). In various embodiments, the FSPA module 500 may store this information so that the information may be used for billing and payment purposes. Such as, for example, billing the subscriber and/or paying a portion of the fee for viewing the movie to the home service provider, foreign service provider, and/or content brokerage provider.

In Step 509, the FSPA module 500 sends an approval request to the HSPA module 600. Described in greater detail below, the HSPA module 600 confirms that the subscriber's purchase has been properly approved and recorded (e.g., committed). This confirmation may entail contacting the subscriber's home service provider to record the purchase with the home service provider. Thus, in Step 510, the FSPA module 500 receives an approval indicator from the HSPA module 600 on whether the purchase has been approved.

In Step 511, if the FSPA module 500 determines the purchase has not been approved, the FSPA module 500 facilitates sending an error message to the subscriber indicating the purchase has not been approved, shown as Step 506. If the FSPA module 500 determines the purchase has been approved, the FSPA module 500 facilitates streaming the content to the subscriber, shown as Step 512. Returning to the example, the FSPA module 500 notifies the foreign service provider system 204 that the subscriber's purchase for viewing the movie has been approved. The foreign service provider system 204 in turn streams the movie from its VOD system over its distribution network 202 to the set-top box 201. As a result, the subscriber is able to view the movie on the television located at his or her friend's home in Chicago.

Home Service Provider Authentication Module

As previously mentioned, in various embodiments, the content brokerage provider system 207 may also include a home service provider authentication (HSPA) module 600 that is adapted to facilitate additional aspects of brokering content between the foreign service provider and the home service provider. However, in other embodiments, the home service provider system 204 may include the HSPA module 600.

As previously described, in various embodiments, the FSPA module 500 receives a request from the foreign service provider system 204 to authenticate a subscriber along with identification information and sends information associated with the request to the HSPA module 600. Therefore, in Step 602, the HSPA module 600 receives this information. In one embodiment, the HSPA module 600 simply forwards the information to the corresponding home service provider system 206. For instance, in one embodiment, the HSPA module 600 reads the subscriber's home service provider from the information and forwards the request to the system 206 of the home service provider indicated in the information.

In other embodiments, the HSPA module 600 may access information stored for the particular subscriber. For instance, in various embodiments, the HSPA module 600 resides on the content brokerage provider system 207 and the system 207 stores information in a profile for the subscriber. In other embodiments, the HSPA module 600 may request the information from the subscriber's home service provider's system 206. Yet, in other embodiments, the HSPA module 600 may reside on the subscriber's home service provider's system 206 and may access the information on the home service provider system 206.

In various embodiments, this information includes an authentication protocol for the subscriber. For example, during the time the subscriber enrolled for the brokering service, the subscriber may have selected a preferred process for authenticating his or her identity. Such authentication protocols may include, for instance, authenticating via SMS messaging, a phone call, an email, or other communication mechanism, such as a stand-alone module that resides on a device of the subscriber. Thus, in Step 603, the HSPA module 600 obtains the subscriber's authentication protocol from the subscriber's stored information.

In Step 604, the HSPA module 600 contacts the subscriber based on the subscriber's authentication protocol. For instance, in one embodiment, the HSPA module 600 facilitates sending the subscriber a SMS message to the subscriber's mobile device. In this particular embodiment, the HSPA module 600 is in communication with the subscriber's wireless provider's system 209. The HSPA module 600 sends a request to the subscriber's wireless provider's system 209 to have the wireless provider's system 209 send a SMS message to the subscriber's wireless device 210 that requests the subscriber to reply back to the message with specific authenticating information. For example, the SMS message may request the subscriber to respond with a username and/or a password. In another example, the SMS message may ask the subscriber to respond with an answer to a particular question, such as "provide your mother's maiden name" or "provide your favorite pet's name."

In this particular instance, the subscriber receives the SMS message and texts back the appropriate response along with the appropriate information. In turn, the wireless provider's system 209 forwards at least a portion of the information received in the response to the HSPA module 600.

In other embodiments, the HSPA module 600 may contact the subscriber based on other authentication protocols. For instance, in one embodiment, the HSPA module 600 sends an email to the subscriber and requests the appropriate information to be sent back to the HSPA module 600 via a response email. In another embodiment, the HSPA module 600 places a telephone call to the subscriber and requests the subscriber to provide appropriate information. Yet, in another embodiment, the subscriber may be requested to access a website that is provided by the content brokerage provider system 208 (or home service provider system 206) over the Internet by using a personal computer 208 and to enter the appropriate information needed to verify the subscriber. One of ordinary skill in the arts can envision numerous authentication protocols in light of this disclosure.

In Step 605, the HSPA module 600 receives the subscriber authenticating information. For instance, in the embodiment in which the subscriber receives a SMS message, the HSPA module 600 receives the information provided in the response from the subscriber to the SMS message. The HSPA module 600 determines from the information whether the subscriber's identity has been authenticated. In one embodiment, this entails the HSPA module 600 comparing the information received from the subscriber with information stored for the subscriber. For example, the HSPA module 600 compares the username and password provided by the subscriber in the response with a username and password stored for the subscriber. In another example, the HSPA module 600 determines whether the subscriber has provided a correct answer to a particular question asked in the request sent to the subscriber.

It should be noted that in various embodiments, the HSPA module 600 may simply send a request (along with appropriate information) to the subscriber's home service provider (e.g., the home service provider system 206) asking the home service provider to authenticate the subscriber. Thus, in these particular embodiments, the home service provider performs whatever process it deems necessary to authenticate the subscriber and sends a response back to the HSPA module 600 as to whether the subscriber's identity has been authenticated or not.

Thus, in Step 606, if the HSPA module 600 determines the subscriber's identity has not been authenticated, the HSPA module 600 facilitates sending a denial to the foreign service provider system 204. For instance, in various embodiments, the HSPA module 600 sends an indicator to the FSPA module 500 that the subscriber has not been authenticated. In turn, the FSPA module 500 facilitates sending a message to the subscriber (through the foreign service provider system 204) indicating to the subscriber that he or she has not been authenticated and therefore has not been approved for purchasing content through the foreign service provider.

If the HSPA module 600 determines the subscriber's identity has been authenticated, in various embodiments, the HSPA module 600 may verify that the subscriber is authorized to purchase content to view through the foreign service provider, shown as Step 608. For example, in one embodiment, the HSPA module 600 send a request to the home service provider system 206 to verify the subscriber is authorized to make purchases from the foreign service provider. In particular embodiments, this may entail the home service provider determining that it is willing to broker content with the foreign service provider and/or the subscriber has enabled the broker feature on his or her account and/or that the subscriber is a customer in good standing with the home service provider. Thus, in these embodiments, the home service provider system 206 sends a response back to the HSPA module 600 indicating whether the subscriber is approved to make purchases.

In other embodiments, the HSPA module 600 may verify the subscriber's authorization without communicating with the home service provider system 206. For instance, in various embodiments, the subscriber may set up a brokering account independent from his or her home service provider. In these particular embodiments, the subscriber may set up an account with the content brokerage provider, and thus the HSPA module 600 may simply confirm with the content brokerage provider system 207 whether the subscriber has an account in good standing with the content brokerage provider. Further, in these particular embodiments, the subscriber may receive a bill for the brokerage transactions directly from the content brokerage provider and not from his or her home service provider.

Thus, in Step 609, the HSPA module 600 determines whether the subscriber is authorized to purchase content for viewing from the foreign service provider. If the HSPA module 600 determines the subscriber is not authorized, the HSPA module 600 facilitates sending a denial to the foreign service provider's system 204 in similar fashion to determining that the subscriber's identity has not been authenticated, shown as Step 607. If the HSPA module 600 determines the subscriber is authorized, the HSPA module 600 facilitates sending a confirmation to the foreign service provider's system 204. For instance, in various embodiments, the HSPA module 600 sends an indicator to the FSPA module 500 of the confirmation. In turn, the FSPA module 500 facilitates sending a message to the subscriber informing him or her that he or she has been authorized and has been approved to purchase content to view from the foreign service provider.

Thus, in the example, the subscriber visiting his or her friend in Chicago selects a movie title from the list of recent releases to view. In turn, in various embodiments, the FSPA module 500 receives information associated with the request and in response sends an approval request to the HSPA module 600.

In Step 611, the HSPA module 600 receives the purchase approval request from the FSPA module 500. (In other embodiments, the HSPA module 500 may receive the approval request directly from the foreign service provider system 204.) In various embodiments, the HSPA module 600 forwards information associated with the approval request to the subscriber's home service provider. Thus, in these particular embodiments, the home service provider system 206 records the purchase for billing and payment purposes and confirms that the purchase has been successfully recorded and approved (e.g., committed). In other embodiments, the HSPA module 600 may simply record the purchase of the content and thus approve the purchase.

In particular embodiments, the HSPA module 600 and/or the home service provider may also consider other parameters in determining whether to approve the purchase request. For instance, in one embodiment, the HSPA module 600 and/or home service provider may determine whether the subscriber has been forbidden to view certain content. For example, profile information stored for the particular subscriber may indicate that the subscriber is forbidden to purchase any R-rated content (e.g., parental controls). Therefore, in this example, the HSPA module 600 and/or the home service provider may determine whether the requested content is R-rated. If so, the HSPA module 600 and/or home service provider may deny the purchase.

In Step 612, the HSPA module 600 determines whether the purchase has been approved. If the HSPA module 600 determines the purchase has not been approved, the HSPA module 600 facilitates sending a denial to the foreign service provider system 204 in a similar fashion as previously described, shown as Step 607. If the HSPA module 600 determines the purchase has been approved, in various embodiments, the HSPA module 600 sends the approval to the FSPA module 500 and the FSPA module 500 sends a response based on the approval to the foreign service provider system 204, shown as Step 613. In other embodiments, the HSPA module 600 sends the approval directly to the foreign service provider system 204. As a result, the foreign service provider streams the movie to the set-top box 201 located at the subscriber's friend's home and the subscriber is able to view the movie.

Furthermore, in various embodiments, the subscriber is able to view the movie and incur the cost of viewing the movie without the fee being charged to the subscriber's friend's account with the foreign service provider. Thus, in various embodiments, the HSPA module 600 facilitates billing the subscriber for viewing the movie through the foreign service provider, shown as Step 614. In particular embodiments, this entails the HSPA module 600 providing the subscriber's home service provider with adequate information to bill the subscriber.

For instance, in one embodiment, when the HSPA module 600 sends information on the purchase transaction along with the approval request to the home service provider system 206, the home service provider system 206 records the purchase transaction information in a billing system 211. This billing system 211 may be a part of the home service provider system 206 or may be a system independent of the home service provider system 206. In turn, the billing system 211 facilitates billing the subscriber for the transaction. For example, the billing system 211 bills the subscriber for the transaction on his or her monthly statement received for services rendered from the home service provider. In other embodiments, the HSPA module 600 sends the purchase transaction information to the home service provider system 206 (e.g., billing system 211 of the home service provider) at a later time. For instance, the HSPA module 600 may batch up all of the purchase transactions for a particular service provider and send the provider the transactions periodically, such as once a month.

In other embodiments, the subscriber may have set up an account with the content brokerage provider and the content brokerage provider directly bills the subscriber for the purchase transaction. In other embodiments, the subscriber may also set up a credit account with the content brokerage provider (or home service provider). Thus, the subscriber may periodically deposit money in the credit account and the content brokerage provider may withdraw the fee for viewing the movie directly from this account. Thus, in various embodiments that involve a content brokerage provider, the HSPA module 600 provides the necessary information to the content brokerage provider (e.g., a billing system 211 for the content brokerage provider) to bill the subscriber accordingly. As in the case with the home service provider, the billing system 211 may be a part of the content brokerage provider system 207 or may be a separate system.

Further, in various embodiments, other parties may be entitled to at least a portion of the fee collected from the subscriber. For instance, in various embodiments, a portion of the fee is paid to the foreign service provider for providing the movie to the subscriber and/or a portion of the fee is paid to the wireless provider for facilitating the authentication protocol. In other instances, the billing system 211 for the content brokerage provider may collect the fee and may facilitate payment of portions of the fee to various parties, such as the home service provider, the foreign service provider, and/or the wireless provider.

Thus, in various embodiments, the HSPA module 600 facilitates payment to these various parties, shown as Step 615. For example, in one embodiment, the HSPA module 600 records the transactions that occur with various subscribers for the content brokerage provider and the content brokerage provider (e.g., content brokerage provider's billing system 211) directly bills the subscribers periodically (such as monthly) for these transactions. Therefore, in the example, the subscriber receives a bill from the content brokerage provider for viewing the movie at his or her friend's home in Chicago. The subscriber sends in a payment to the content brokerage provider and the content brokerage provider (e.g., content brokerage provider's billing system 211) calculates the portions of the fee to be paid to the various parties, such as the subscriber's home service provider and the foreign service provider. In various embodiments, this may be all automated so that the billing system 211 is further configured to electronically send each party's portion of the collected fees to the party's corresponding systems and/or banking systems.

Further, in various embodiments, the HSPA module 600 may simply record all of the transactions that occur and periodically send reports to the various parties on the transactions. The parties may then use these reports to determine what fee is due to what parties involved in the transactions. For instance, in the example, the HSPA module 600 sends the foreign service provider system 204 a report at the end of each month and the report lists the transaction in which the subscriber purchased the movie while staying at his or her friend's home in Chicago. The foreign service provider then contacts the subscriber's home service provider and requests at least a portion of the fee collected for the transaction. In turn, the home service provider pays the foreign service provider the portion of the fee for providing the subscriber with the movie while at the friend's home.

Subscriber Device Module

As previously described, in various embodiments, authentication protocols are used to facilitate authenticating the identities of subscribers. Such authentication protocols may include, for instance, authenticating via SMS messaging, a phone call, an email, or other communication mechanism. In various embodiments, one such mechanism is a module 700 that resides on the subscriber's device 210. For instance, in one embodiment, the content brokerage provider may provide the device module 700 and the subscriber installs (e.g., downloads) the module 700 onto his or her device. (For example, the content brokerage provider may provide the module 700 as an application to download onto an iPhone® and/or Blackberry® device.)

In various embodiments, the module 700 provides one or more interactive screens that the subscriber uses to receive an authentication request and to send a response to the authentication request. In particular embodiments, the module 700 may be adapted to communicate with the system sending the request (e.g., the content brokerage provider system 207 and/or the home service provider system 206). For example, in one embodiment, the request and response are sent over the Internet (possibly through a secure channel such as VPN and/or an encrypted message). In another example, the request and response are sent over a wireless provider's network.

Accordingly, FIG. 7 illustrates a flow diagram of a subscriber device module 700 according to various embodiments. Thus, in various embodiments, a system (such as the content brokerage provider system 207 or the home service provider system 206) sends a request to the subscriber to authenticate the identity of the subscriber. For example, in one embodiment, the content brokerage provider system 207 sends the request over the Internet to the module 700 residing on the subscriber's device 210. In another embodiment, the content brokerage provider system 207 sends a request to the subscriber's wireless provider and the wireless provider sends a message over the wireless provider's network to the module 700. Thus, in Step 702, the module 700 receives the request and notifies the subscriber. The notification may entail producing a sound, visual effect, and/or vibration on/of the device 210. The subscriber enters a screen for the module 700 and the request is displayed for the subscriber. For example, the request may state, "have you requested to view a movie through foreign service provider? If so, please enter your username and password to confirm." In response, the subscriber types the subscriber's username and password into the screen using a keyboard on the device and selects a send button. The module 700 receives the subscriber's input in Step 703 and sends the input over a communication channel (such as the Internet) to the system that originated the request in Step 704.

Alternative Subscriber Device Module and Set-Top Box API Module

In alternative embodiments, the subscriber's device 210 may include an alternative subscriber device module 800 that is configured to communicate directly with the set-top box 201 through an application program interface (API) module 900 to facilitate the authentication process. Thus, FIG. 8 illustrates a flow diagram of the module 800 according to various embodiments.

The subscriber brings up an interface associated with the module 800 on his or her device and provides input to the device indicating that the subscriber would like to purchase content to view through the foreign service provider. Thus, in Step 802, the module 800 receives the input.

As mentioned, in particular embodiments, the module 800 is configured to communicate directly with the set-top box 201. For instance, in one embodiment, the module 800 communicates with the set-top box 201 via infrared sensors that are found on many typical set-top boxes 201. Thus, the subscriber's device 210 is configured to send an infrared signal and the module 800 sends the subscriber's request to the set-top box 201 to purchase content to view through the foreign service provider, shown as Step 803.

In other embodiments, the module 800 may send the request via other communication channels, such as Bluetooth® or directly by a wired link. Thus, in these particular embodiments, equipment and programming to provide these capabilities may need to be included along with the set-top box 201.

The request may include various types of information. For instance, in one embodiment, the request may simply include the name of the subscriber's home service provider and information to identify the subscriber, such as the subscriber's account number with the home service provider. In other embodiments, the request may include more detailed information, such as a username and password. In these particular embodiments, the subscriber may be required to enter the username and password along with the initial input.

As is described below, in various embodiments, the set-top box 201 forwards the request to the foreign service provider system 204. At this point, the foreign service provider system 204 takes the appropriate steps to authenticate the subscriber and approve the subscriber to purchase content to view from the foreign service provider (as previously described). In various embodiments, the foreign service provider system 204 receives an authentication response (e.g., approval or denial) for the subscriber and sends information associated with the response to the set-top box 201. Thus, in particular embodiments, the set-top box 201 sends information associated with the response to the subscriber's device 210. In Step 804, the module 800 on the subscriber's device 201 receives the response and displays the response to the subscriber, shown as Step 805. If the subscriber is approved, the subscriber can now browse the available content through various menus provided by the set-top box 201 and select a desired content to view.

In other embodiments, the set-top box 201 may not forward the authentication response to the subscriber's device 210. For instance, in various embodiments, the authentication response may be channeled through the subscriber's wireless provider's system 209 to the subscriber's device 210 or may simply display the authentication response to the subscriber on the television. Thus, in these particular embodiments, the set-top box 201 may not need to be configured to send information to the subscriber's device 210.

FIG. 9 illustrates a flow diagram of the API module 900 residing on the set-top box 201 according to various embodiments. As previously described, in Step 902, the API module 900 receives the request from the subscriber's device 210. In various embodiments, the API module 900 sends the request to authenticate the subscriber to the foreign service provider system 204, shown as Step 903. As previously described, depending on the embodiment, the foreign service provider system 204 conducts the necessary steps to authenticate the subscriber, such as sending information associated with the request to the content brokerage provider system 207 or home service provider system 206. However, in particular embodiments, the authentication protocol may or may not be performed. For instance, in various embodiments, a message may not be sent to the subscriber's device 210 to provide further authentication information. This may be because the original request sent from the subscriber's device 210 to the API module 900 may already include the required information to authenticate the subscriber. However, in other embodiments, a message may be sent to the subscriber's device 210 to provide additional information to further authenticate the subscriber.

In Step 904, the API module 900 receives the response to the authentication request. Thus, in various embodiments, the API module 900 sends information associated with the response to the subscriber's device 210. However, in other embodiments, the API module 900 simply displays the results of the request to the subscriber on the television. At this point, the subscriber is informed whether he or she has been authenticated and has been approved to purchase content through the foreign service provider.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended listing of inventive concepts. Although specific terms are employed herein, they are used in a generic and descriptive sense only and not for purposes of limitation.

What is claimed is:

1. A system for providing a subscriber of a first video service provider with content to view over a video distribution network of a second video service provider comprising:
    a computer system adapted to:
        (a) receive a message comprising identification information for the subscriber that is received over a first communication channel from a system of the second video service provider;
        (b) send at least a portion of the identification information over a second communication channel to a system of the first video service provider so that the first video service provider can authenticate the identity of the subscriber based on the portion of identification information and can send an authenticating confirmation that the subscriber's identity has been authenticated;
        (c) receive the authenticating confirmation over the second communication channel from the system of the first video service provider; and
        (d) in response to the authenticating confirmation indicating that the first video service provider has authenticated the identity of the subscriber:
            (1) send an authentication notification over the first communication channel to the system of the second video service provider indicating the subscriber has been authenticated so that the subscriber can select a particular video content provided by the second video service provider to view for a fee over the second video provider's video distribution network;
            (2) receive a content indicator indicating a particular video content selected by the subscriber to view over the second video service provider's video distribution network; and
            (3) in response to receiving the content indicator, send a purchase notification over the second communication channel to the system of the first video service provider to record in a billing system, the purchase notification comprising information indicating the subscriber has selected the particular video content to view for the fee over the second video service provider's video distribution network.

2. The system of claim 1, wherein the computer system is further adapted to:
    in response to send the purchase notification:
        receive an approval indicator over the second communication channel from the system of the first video service provider indicating whether the first video service provider approves the subscriber's purchase; and
        in response to the approval indicator indicating the first video service provider approves the purchase, send a purchase approval indicator over the first communication channel to the system of the second video service provider.

3. The system of claim 1, wherein the message comprises a username and a password that identify the subscriber.

4. A method for providing a subscriber of a first video service provider with content to view over a video distribution network of a second video service provider, the method comprising the steps of:
    (a) receiving a message comprising identification information for the subscriber that is received over a first communication channel from a system of the second video service provider;
    (b) sending at least a portion of the identification information over a second communication channel to a system of the first video service provider so that the first video service provider can authenticate the identity of the subscriber based on the portion of identification information and can send an authenticating confirmation that the subscriber's identity has been authenticated;
    (c) receiving the authenticating confirmation over the second communication channel from the system of the first video service provider; and
    (d) in response to the authenticating confirmation indicating that the first video service provider has authenticated the identity of the subscriber:

(1) sending an authentication notification over the first communication channel to the system of the second video service provider indicating the subscriber has been authenticated so that the subscriber can select a particular video content provided by the second video service provider to view for a fee over the second video provider's video distribution network;

(2) receiving a content indicator indicating a particular video content selected by the subscriber to view over the second video service provider's video distribution network; and (3) in response to receiving the content indicator, sending a purchase notification over the second communication channel to the system of the first video service provider to record in a billing system, the purchase notification comprising information indicating the subscriber has selected the particular video content to view for the fee over the second video service provider's video distribution network.

5. The method of claim 4 further comprising the steps:
in response to send the purchase notification:
receiving an approval indicator over the second communication channel from the system of the first video service provider indicating whether the first video service provider approves the subscriber's purchase; and
in response to the approval indicator indicating the first video service provider approves the purchase, sending a purchase approval indicator over the first communication channel to the system of the second video service provider.

6. The method of claim 4, wherein the message comprises a username and a password that identify the subscriber.

7. A system for verifying a subscriber of a first video service provider is authorized to purchase video content to view over a video distribution network of a second video service provider comprising:
a computer system adapted to:
(a) receive a request to authenticate an identity of the subscriber, the request comprising identification information of the subscriber and is received over a first communication channel from a system of the second video service provider;
(b) obtain an authenticating protocol stored in memory based on the identification information;
(c) contact the subscriber over a second communication channel based on the authenticating protocol to request the subscriber to provide an authenticating response, the authenticating response comprising authenticating information;
(d) receive the authenticating response from the subscriber over the second communication channel;
(e) determine whether the authenticating information authenticates the identity of the subscriber;
(f) in response to the authenticating information authenticating the identity of the subscriber:
(1) send a confirmation over the first communication channel to the system of the second video service provider that the subscriber is authenticated, wherein the second video service provider can provide the subscriber with video content to view over the video distribution network of the second video service provider; and
(2) in response to receiving information over the first communication channel that the subscriber has requested to purchase a particular video content to view over the video distribution network of the second video service provider for a fee, record an indication in a billing system.

8. The system of claim 7, wherein the computer system is further adapted to in response to the authenticating information authenticating the identity of the subscriber
verify the subscriber is authorized to purchase content to view over the video distribution network of the second video service provider by confirming the subscriber has enabled a feature to purchase video content through the second video service provider and has appropriate credit.

9. The system of claim 7, wherein the second communication channel is a wireless network and the computer system is adapted to:
contact the subscriber over the wireless networking through a short message communication service to a wireless device; and
receive the authenticating response entered by the subscriber on the wireless device over the wireless network through the short message communication service.

10. The system of claim 7, wherein the second communication channel is Internet and the computer system is adapted to:
contact the subscriber over the Internet through an email service by sending an email; and
receive the authenticating response entered by the subscriber as an email sent over the Internet through the email service.

11. The system of claim 7, wherein the authenticating information comprises a username and password that identify the subscriber.

12. A method for verifying a subscriber of a first video service provider is authorized to purchase video content to view over a video distribution network of a second video service provider, the method comprising the steps of:
(a) receiving a request to authenticate an identity of the subscriber over a first communication channel from a system of the second video service provider, the request comprising identification information of the subscriber;
(b) obtaining an authenticating protocol stored in memory based on the identification information;
(c) contacting the subscriber over a second communication channel based on the authenticating protocol to request the subscriber to provide an authenticating response, the authenticating response comprising authenticating information;
(d) receiving the authenticating response from the subscriber over the second communication channel;
(e) determining whether the authenticating information authenticates the identity of the subscriber;
(f) in response to the authenticating information authenticating the identity of the subscriber:
(1) sending a confirmation over the first communication channel to the system of the second video service provider that the subscriber is authenticated, wherein the second video service provider can provide the subscriber a purchased video content to view over the video distribution network of the second video service provider; and
(2) in response to receiving information over the first communication channel that the subscriber has requested to purchase video content to view over the video distribution network of the second video service provider for a fee, recording an indication in a billing system.

13. The method of claim 12, wherein the method further comprises the steps, in response to the authenticating information authenticating the identity of the subscriber, verifying the subscriber is authorized to purchase content to view over the video distribution network of the second video service provider by confirming the subscriber has enabled a feature to purchase video content through the second video service provider and has appropriate credit.

14. The method of claim 12, wherein the second communication channel is a wireless network and the method further comprises the steps of:
  contacting the subscriber over the wireless networking through a short message communication service to a wireless device; and
  receiving the authenticating response entered by the subscriber on the wireless device over the wireless network through the short message communication service.

15. The method of claim 12, wherein the second communication channel is Internet and the method further comprises the steps of:
  contacting the subscriber over the Internet through an email service by sending an email; and
  receiving the authenticating response entered by the subscriber as an email sent over the Internet through the email service.

16. The method of claim 12, wherein the authenticating information comprises a username and password that identify the subscriber.

17. A system for providing a subscriber of a first video service provider with content to view over a video distribution network of a second video service provider comprising:
  a computer system adapted to:
    (a) receive a message comprising identification information for the subscriber that is received over a first communication channel from a system of the second video service provider;
    (b) obtain an authenticating protocol stored in memory based on the identification information;
    (c) contact the subscriber over a second communication channel based on the authenticating protocol to request the subscriber to provide an authenticating response, the authenticating response comprising authenticating information;
    (d) receive the authenticating response from the subscriber over the second communication channel;
    (e) determine whether the authenticating information authenticates the identity of the subscriber based on at least a portion of the identification information;
    (f) in response to the authenticating information authenticating the identity of the subscriber:
      (1) send an authentication notification over the first communication channel to the system of the second video service provider indicating the subscriber has been authenticated so that the subscriber can select a particular video content provided by the second video service provider to view for a fee over the second video provider's video distribution network;
      (2) receive a content indicator over the first communication channel indicating a particular video content selected by the subscriber to view for a fee over the second video service provider's video distribution network; and
      (3) in response to receiving the content indicator, send a purchase notification over a third communication channel to a system of the first video service provider to record in a billing system, the purchase notification comprising information indicating the subscriber has selected the particular video content to view for the fee over the second video service provider's video distribution network.

* * * * *